US011290462B2

(12) United States Patent
Mukaiyachi

(10) Patent No.: US 11,290,462 B2
(45) Date of Patent: Mar. 29, 2022

(54) COMMUNICATION DEVICE, COMMUNICATION METHOD, AND PROGRAM

(71) Applicant: NEC CORPORATION, Tokyo (JP)

(72) Inventor: Tamotsu Mukaiyachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 345 days.

(21) Appl. No.: 16/464,567

(22) PCT Filed: Nov. 28, 2017

(86) PCT No.: PCT/JP2017/042557
§ 371 (c)(1),
(2) Date: May 28, 2019

(87) PCT Pub. No.: WO2018/101243
PCT Pub. Date: Jun. 7, 2018

(65) Prior Publication Data
US 2021/0105279 A1   Apr. 8, 2021

(30) Foreign Application Priority Data
Nov. 30, 2016   (JP) .............................. JP2016-232047

(51) Int. Cl.
*H04L 29/00*   (2006.01)
*H04L 29/06*   (2006.01)
*H04L 61/4511*   (2022.01)

(52) U.S. Cl.
CPC ........ *H04L 63/102* (2013.01); *H04L 61/1511* (2013.01); *H04L 63/0428* (2013.01); *H04L 63/205* (2013.01)

(58) Field of Classification Search
CPC ............... H04L 63/102; H04L 61/1511; H04L 63/0428; H04L 63/205; H04L 12/66; G06F 13/00
See application file for complete search history.

(56) References Cited

U.S. PATENT DOCUMENTS 8,918,867 B1   12/2014 Salour
10,505,961 B2 *   12/2019 Uppal ................. H04L 61/6059
(Continued)

FOREIGN PATENT DOCUMENTS

| CN | 1767435 A | 5/2006 |
|---|---|---|
| EA | 018130 B1 | 5/2013 |

(Continued)

OTHER PUBLICATIONS

Communication dated Oct. 31, 2019 by the Taiwanese Patent Office in application No. 106141496.
(Continued)

*Primary Examiner* — Don G Zhao
(74) *Attorney, Agent, or Firm* — Sughrue Mion, PLLC

(57) ABSTRACT

A communication device includes: a server information detection unit that detects server information from a request communication requesting the initiation of encryption of a communication, the request communication being transmitted by a delivery destination device at the time when the delivery destination device receives data from a server device; a domain name detection unit that detects a domain name corresponding to the server information; and a restriction unit that performs data communication restriction with respect to the data transmitted from the server device to the delivery destination device based on the domain name.

5 Claims, 4 Drawing Sheets

(56) References Cited

U.S. PATENT DOCUMENTS

| | | | |
|---|---|---|---|
| 10,924,456 B1* | 2/2021 | Moore | H04L 63/306 |
| 2005/0262239 A1* | 11/2005 | Kawakita | G06F 16/9535 |
| | | | 709/224 |
| 2006/0059337 A1* | 3/2006 | Poyhonen | H04L 61/1511 |
| | | | 713/165 |
| 2007/0211714 A1* | 9/2007 | Metke | H04L 61/25 |
| | | | 370/389 |
| 2007/0214283 A1* | 9/2007 | Metke | H04L 61/1511 |
| | | | 709/245 |
| 2013/0326601 A1* | 12/2013 | Nishikawa | H04N 21/25816 |
| | | | 726/6 |
| 2014/0089507 A1* | 3/2014 | Prakash | H04N 21/6125 |
| | | | 709/225 |
| 2014/0123301 A1* | 5/2014 | Kaliski, Jr. | G06F 21/6263 |
| | | | 726/26 |
| 2016/0028607 A1 | 1/2016 | Weill et al. | |
| 2016/0094602 A1 | 3/2016 | Fuh et al. | |
| 2016/0140355 A1* | 5/2016 | Jagota | G06F 21/6218 |
| | | | 707/785 |
| 2016/0255047 A1* | 9/2016 | Parthasarathy | H04L 61/3025 |
| | | | 709/245 |
| 2016/0359887 A1* | 12/2016 | Yadav | H04L 61/1511 |
| 2017/0262651 A1* | 9/2017 | Kaliski, Jr. | G06F 21/6227 |
| 2017/0345063 A1* | 11/2017 | Bauman | G06Q 30/0277 |

FOREIGN PATENT DOCUMENTS

| | | |
|---|---|---|
| JP | 2015-513810 A | 5/2015 |
| RU | 2 368 090 C2 | 9/2009 |
| WO | 2013/112389 A1 | 8/2013 |

OTHER PUBLICATIONS

First Office Action dated Oct. 19, 2020 from the China National Intellectual Property Administration in CN Application No. 201780072692.2.

International Search Report for PCT/JP2017/042557 dated Feb. 6, 2018 (PCT/ISA/210).

Communication dated Jan. 28, 2020 by the Russian Patent Office in application No. 2019116016.

* cited by examiner

| SERVICE | Server Name Indication | CommonName |
|---|---|---|
| MOVIES | xxx.movie | xxx.com |
| APPLICATION PROGRAMS | xxx.app | xxx.com |

COMMUNICATION DEVICE, COMMUNICATION METHOD, AND PROGRAM

CROSS REFERENCE TO RELATED APPLICATIONS

This application is a National Stage of International Application No. PCT/JP2017/042557 filed Nov. 28, 2017, claiming priority based on Japanese Patent Application No. 2016-232047, filed Nov. 30, 2016, the disclosures of which are incorporated herein in their entirety.

TECHNICAL FIELD

The present invention relates to a communication device, a communication method, and a program.

BACKGROUND ART

In recent years, it has become common for data communication between server devices and terminals to be encrypted. Under such circumstances, control of the transfer amount per unit time is only required for specific data within the data which is transmitted from a server device to a terminal. Disclosed in Patent Document 1 as a related technique is a technique that uses the information from an SSL (Secure Sockets Layer) communication, which is an encrypted communication.

CITATION LIST

Patent Literature

[Patent Document 1] Published Japanese Translation No. 2015-513810 of PCT International Publication

SUMMARY OF INVENTION

Problems to be Solved by the Invention

Therefore, the present invention has an object of providing a communication device, a communication method, and a program that solve the above problem.

Means for Solving the Problem

According to a first exemplary aspect of the present invention, a communication device includes: a server information detection unit that detects server information from a request communication requesting the initiation of encryption of a communication, the request communication being transmitted by a delivery destination device at the time when the delivery destination device receives data from a server device; a domain name detection unit that detects a domain name corresponding to the server information; and a restriction unit that performs data communication restriction with respect to the data transmitted from the server device to the delivery destination device based on the domain name.

According to a second exemplary aspect of the present invention, a communication method causes a communication device to execute the steps of: detecting server information from a request communication requesting the initiation of encryption of a communication, the request communication being transmitted by a delivery destination device at the time when the delivery destination device receives data from a server device; detecting a domain name corresponding to the server information; and performing data communication restriction with respect to the data transmitted from the server device to the delivery destination device based on the domain name.

According to a third exemplary aspect of the present invention, a program causes a computer of a communication device to execute the steps of: detecting server information from a request communication requesting the initiation of encryption of a communication, the request communication being transmitted by a delivery destination device at the time when the delivery destination device receives data from a server device; detecting a domain name corresponding to the server information; and performing data communication restriction with respect to the data transmitted from the server device to the delivery destination device based on the domain name.

Advantageous Effects of Invention

According to the present invention, it is possible to use an encrypted data communication to identify specific data, and to perform transfer control with respect to the data communication.

DESCRIPTION OF EMBODIMENTS

Hereunder, a communication device according to an exemplary embodiment of the present invention will be described with reference to the drawings.

Figure 1:
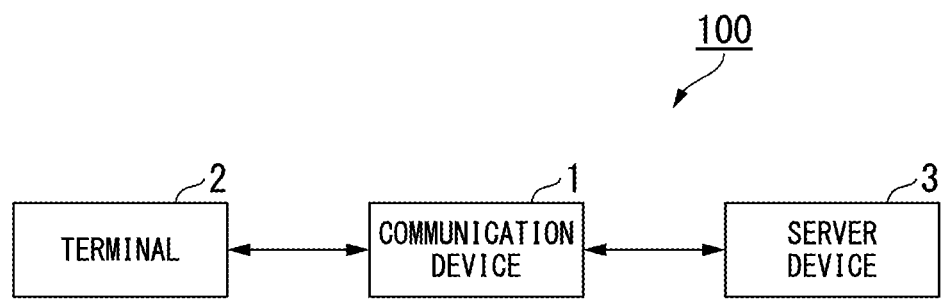
FIG. 1 is a block diagram showing a configuration of a communication system which includes a communication device according to a present exemplary embodiment.

FIG. 1 is a block diagram showing a configuration of a communication system which includes a communication device according to the present exemplary embodiment.

As shown in the diagram, a communication system 100 includes a communication device 1, a terminal 2 (delivery destination device), and a server device 3. The communication device 1 and the terminal 2 are connected via a first network that connects to an Internet network. The communication device 1 and the server device 3 are connected via a second network that connects to an Internet network. The first network and the second network may represent indoor networks on which the communication device 1 is located. The first network and the second network are connected to an Internet network via a gateway device or the like (not shown in the drawing). In FIG. 1, the network that connects the communication device 1 and the terminal 2, and the network that connects the communication device 1 and the server device 3, are separately drawn for convenience of description.

Figure 2:
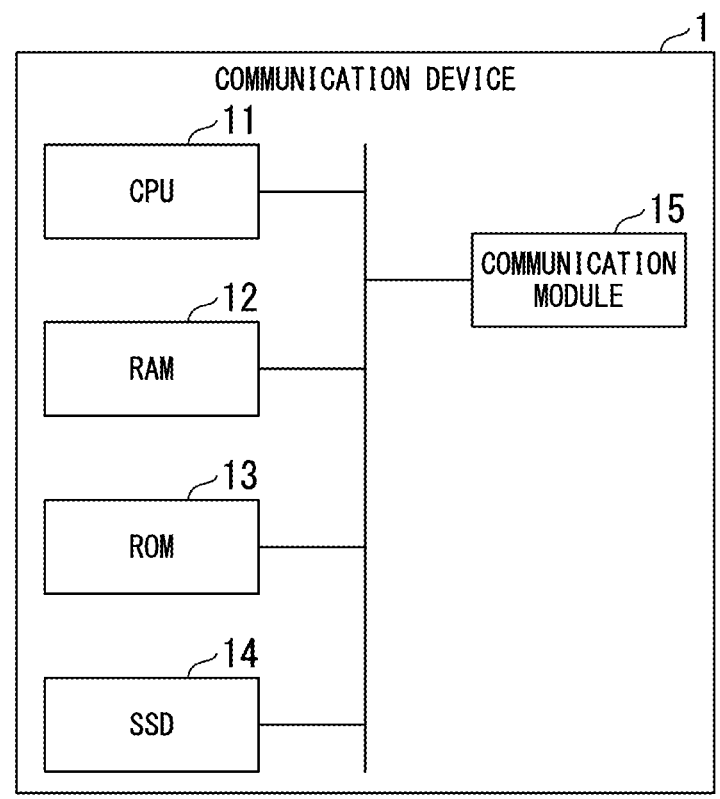
FIG. 2 is a hardware configuration diagram of a communication device according to the present exemplary embodiment.

FIG. 2 is a hardware configuration diagram of a communication device according to the present exemplary embodiment.

As shown in FIG. 2, the communication device 1 may include a CPU (Central Processing Unit) 11, a RAM (Random Access Memory) 12, a ROM (Read Only Memory) 13, an SSD (Solid State Drive) 14, a communication module 15, and the like. The communication device 1 is a computer having such functions. For example, the communication device 1 may be a router, a relay server, or the like.

Figure 3:
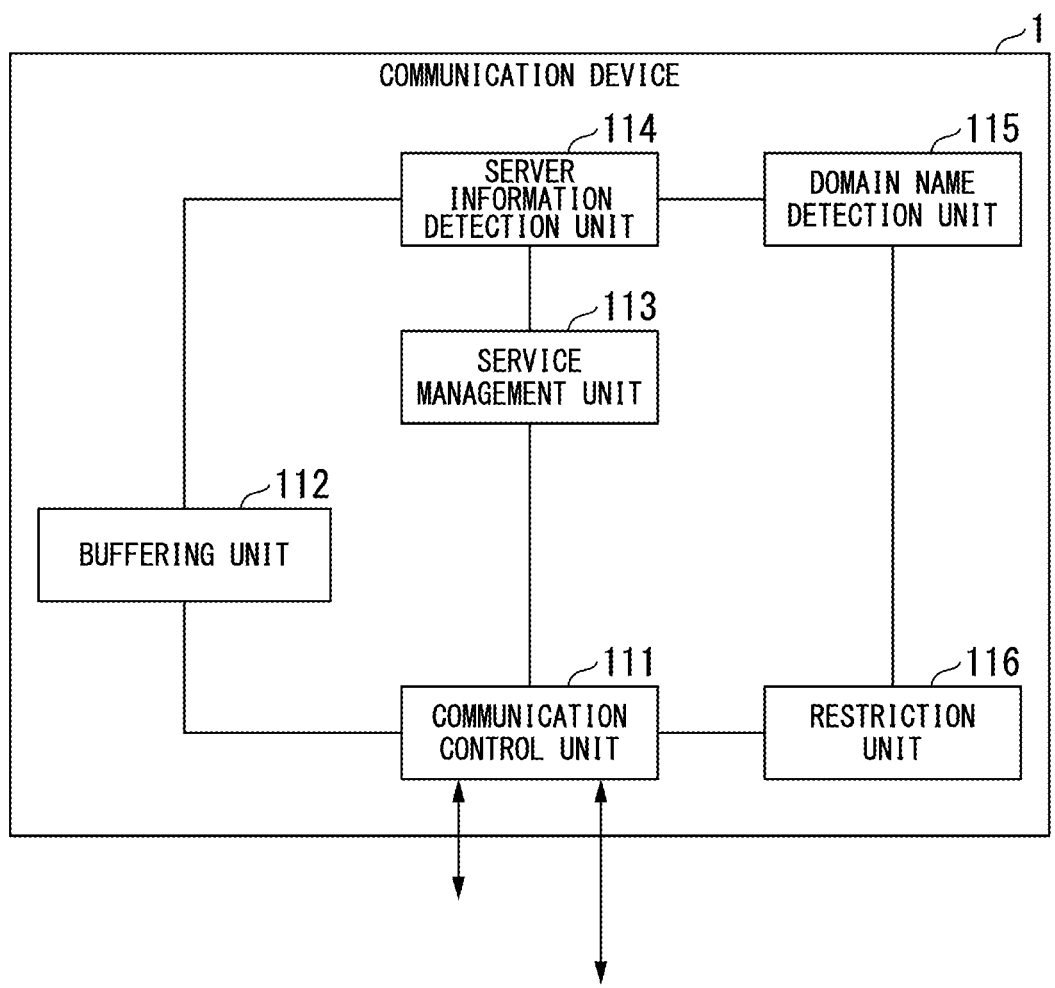
FIG. 3 is a functional block diagram of a communication device according to the present exemplary embodiment.

FIG. 3 is a functional block diagram of a communication device according to the present exemplary embodiment.

A transfer control program stored in the ROM 13 (FIG. 2) or the like is executed by initializing the CPU 11 (FIG. 2) of the communication device 1. As a result, the communication device 1 has the functions of a communication control unit 111, a buffering unit 112, a service management unit 113, a server information detection unit 114, a domain name detection unit 115, and a restriction unit 116.

The communication control unit 111 controls the communications with other devices that are connected via the first network or the second network. The communication control unit 111 outputs to the buffering unit 112 an SSL (Secure Sockets Layer)/TLS (Transport Layer Security) communication signal and the like received from the terminal 2. Furthermore, the communication control unit 111 has the function of a proxy server. The communication control unit 111 connects to the first network and the second network.

The buffering unit 112 buffers data for each connection generated in negotiation communications with other devices over a period from the initiation of an SSL/TLS communication until Server Name Indication information can be acquired.

The service management unit 113 is a processing unit that analyzes a received signal and makes determinations related to subsequent processing controls. Specifically, the service management unit 113 determines a requested service, and performs SSL analysis and the like, based on a communication.

The server information detection unit 114 detects server information from a request communication requesting the initiation of encryption of a communication, the request communication being transmitted by the terminal 2 at the time data is received from the server device 3. Specifically, the server information detection unit 114 detects Server Name Indication information from within the information buffered by the buffering unit 112.

The domain name detection unit 115 detects a domain name corresponding to the Server Name Indication information.

The restriction unit 116 performs data communication restriction with respect to the data transmitted from the server device 3 to the terminal 2 on the basis of the detected domain name. Specifically, the restriction unit 116 suppresses the transfer amount of data per unit time when data transmitted from the server device 3 to the terminal 2 is relayed on the basis of an SSL/TLS communication representing a request communication.

The communication device 1 of the present exemplary embodiment identifies a Client Hello message transmitted as plain text from the terminal 2 during a handshake phase of an encrypted communication (such as SSL/TLS) transmitted from the terminal 2. The communication device 1 acquires a Server Name Indication included in the Client Hello message. Furthermore, the communication device 1 acquires the domain name which is stored associated with the Server Name Indication. The communication device 1 uses a transfer amount per unit time set beforehand for each domain name to perform flow amount control (paging control) with respect to the data transmitted from the server device 3 to the terminal 2.

The SSL server certificate transmitted from the server device 3 during the handshake phase of the encrypted communication separately includes information referred to as a Common Name. The communication device 1 is also capable of specifying the domain name corresponding to an IP address from the Common Name. However, in the present exemplary embodiment, the domain name corresponding to a service, which is a different domain name from the domain name corresponding to an IP address, is acquired from the Server Name Indication included in the Client Hello message. Normally, only one SSL certificate can be set for a single IP address. Consequently, a Common Name and an IP address have a one-to-one correspondence. However, as an extended specification of SSL/TLS, a Server Name Indication defined by RFC 6066 allows the SSL certificates of multiple domains to be set to a single IP address. Therefore, in the present exemplary embodiment, a target domain can be more precisely acquired by using the Server Name Indication rather than the Common Name. For example, the target domain is a domain that delivers data to the terminal 2.

Figure 4:
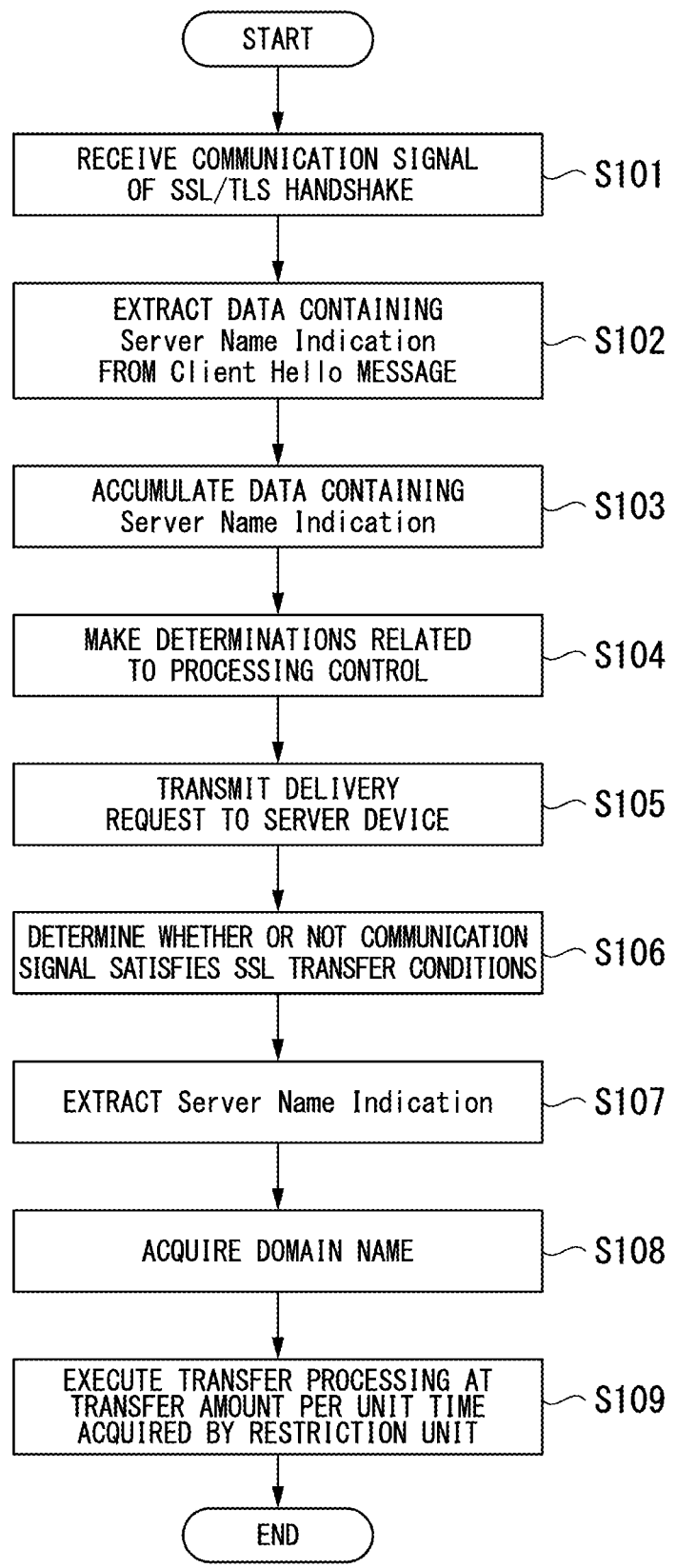
FIG. 4 is a diagram showing a processing flow of a communication device according to the present exemplary embodiment.

FIG. 4 is a diagram showing a processing flow of a communication device according to the present exemplary embodiment.

Firstly, the terminal 2 transmits a request communication requesting the initiation of encryption of a communication to the server device 3, the request communication being transmitted at the time data is received from the server device 3. The request signal represents the communication signal of an SSL/TLS handshake. The communication control unit 111 of the communication device 1 receives the communication signal of the SSL/TLS handshake transmitted from the terminal 2 (step S101). The buffering unit 112 intercepts the communication signal of the SSL/TLS handshake. The buffering unit 112 extracts data containing a Server Name Indication from a Client Hello message in the communication signal of the SSL/TLS handshake (step S102). The buffering unit 112 accumulates the data containing the Server Name Indication (step S103). The communication control unit 111 relays the communication signal of the SSL/TLS handshake, which is transmitted and received between the terminal 2 and the server device 3.

The service management unit 113 acquires; the communication signal of the SSL/TLS handshake, communication signal information subsequent to completion of the handshake, and the like, from the communication control unit 111. The service management unit 113 analyzes the communication signals and makes determinations related to subsequent processing controls (step S104). When the service management unit 113 determines (analyzes) the server device 3 based on the communication signals, it instructs the communication control unit 111 to transmit a data delivery request to the server device 3. The communication control unit 111 transmits a delivery request to the server device 3 for data to be transmitted to the terminal 2 (step S105). The server device 3 transmits delivery data addressed to the terminal 2 to the communication device 1, which has the functions of a proxy server.

The service management unit 113 of the communication device 1 intercepts the communication signal containing the delivery data via the communication control unit 111, and determines whether or not the communication signal, which contains an SSL/TLS handshake, delivery data, and the like, satisfies SSL transfer conditions (step S106). The service management unit 113 makes the determination based on the analysis result from step S104. For example, if the service management unit 113 detects a communication signal of an SSL/TLS handshake, a determination that the communication between the terminal 2 and the server device 3 performing the handshake satisfies the SSL transfer conditions may immediately be made. The determination of whether or not SSL transfer conditions are satisfied can be made by other methods. If SSL transfer conditions are satisfied, the service management unit 113 requests the server information detection unit 114 to detect server information. In the present exemplary embodiment, the server information represents the Server Name Indication included in the Client Hello message.

The server information detection unit 114 acquires data containing the Server Name Indication from the Client Hello message accumulated by the buffering unit 112. The server information detection unit 114 extracts the Server Name Indication from the data (step S107). Furthermore, the server information detection unit 114 outputs the Server Name Indication to the domain name detection unit 115. The domain name detection unit 115 refers to a domain management table recorded in a recording unit, such as the ROM 13 (FIG. 2) or the SSD 14 (FIG. 2), and acquires the domain name which is stored associated with the Server Name Indication (step S108). The domain name detection unit 115 outputs the acquired domain name to the restriction unit 116.

The restriction unit 116 detects the restriction method corresponding to the domain name. The restriction unit 116 acquires a transfer amount of data per unit time associated with the domain name for example. The correspondence between the domain name and the transfer amount per unit time is stored in a storage unit, such as the ROM 13 or the SSD 14. The restriction unit 116 controls the communication control unit 111 such that transfer of the data is controlled according to the acquired transfer amount per unit time (paging rate). The communication control unit 111 is controlled based on the restriction unit 116, and performs transfer of the delivery data which is transmitted to the terminal 2 from the server device 3 by means of a proxy server function. At this time, the communication control unit 111 performs transfer processing such that the transfer amount of the delivery data per unit time is set to the transfer amount per unit time acquired by the restriction unit 116 (step S109).

Figures 5, 6:
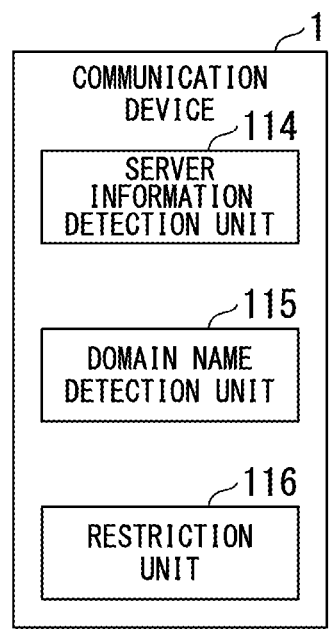
FIG. 5 is a diagram showing the correspondence between a Server Name Indication and a Common Name.
FIG. 6 is a diagram showing a minimum configuration of a communication device according to the present exemplary embodiment.

FIG. 5 is a diagram showing the correspondence between a Server Name Indication and a Common Name included in a communication signal of an SSL/TLS handshake.

The communication signal of an SSL/TLS handshake contains a Server Name Indication and a Common Name. Although both the Server Name Indication and the Common Name represent the domain name, the Server Name Indication enables a server name (service name) to be acquired as the domain name. For a plurality of service communications transmitted by a server device, the Server Name Indication can be different in some cases despite the Common Name being the same. According to the example of FIG. 5, although the "movies" service and the "application programs" service have the same Common Name information of "xxx.com", the Server Name Indication information is different. In other words, the Common Name is the same information for a plurality of services ("movies" and "application programs"). Consequently, if the communication device 1 determines the transfer amount per unit time (transfer rate) based on the Common Name, the restriction target can sometimes include not only the delivery of movies, which represents a desired restriction target, but similarly the downloads of application programs despite exclusion from restriction being desired.

Therefore, in the present exemplary embodiment, the Server Name Indication is used as mentioned above. As a result, even for a plurality of services delivered from the same server, the domain names included in a communication can be made different between the services. Therefore, according to the present exemplary embodiment, the transfer amount of data per unit time is capable of being set with respect to each of the plurality of services delivered from the same server. That is, according to the example of FIG. 5, it becomes possible to lower the transfer rate of a video data download to the terminal 2 associated with a video delivery service without lowering the transfer rate of an application program download to the terminal 2 for example. Consequently, it becomes possible to reduce the bandwidth of a service without lowering the QoE (quality of experience).

The terminal 2 mentioned above may be any device that requests transmission of delivery data with respect to the server device 3, and consequently receives the transmitted delivery data. For example, the terminal 2 may represent; a mobile phone including a smartphone, a tablet terminal, a personal computer, a television having a network connection function, and the like.

FIG. 6 is a diagram showing a minimum configuration of a communication device according to the present exemplary embodiment.

The communication device 1 may include at least a server information detection unit 114, a domain name detection unit 115, and a restriction unit 116.

The communication device 1 may be configured by an electronic circuit included in the communication device 1 for example.

The communication device 1 mentioned above has an internal computer system. Further, the steps of the processing mentioned above are stored on a computer-readable recording medium in the form of a program, and the processing described above is performed by a computer reading and executing the program. Here, the computer-readable recording medium refers to a magnetic disk, a magneto-optical disk, a CD-ROM, a DVD-ROM, a semiconductor memory, and the like. Furthermore, the program may be delivered to the computer by means of a communication line, and the computer receiving the delivery may execute the program.

Moreover, the program described above may be one that realizes a portion of the functions mentioned above. Further, the program may be one that realizes the functions mentioned above by being combined with a program already recorded on the computer system, as a so-called difference file (difference program).

INDUSTRIAL APPLICABILITY

According to the present invention, it is possible to use an encrypted data communication to identify specific data, and to perform transfer control with respect to the data communication.

REFERENCE SIGNS LIST

1 Communication device
2 Terminal
3 Server device
11 CPU

12 RAM
13 ROM
14 SSD
15 Communication module
111 Communication control unit
112 Buffering unit
113 Service management unit
114 Server information detection unit
115 Domain name detection unit
116 Restriction unit

The invention claimed is:

1. A communication device comprising:
at least one memory configured to store instructions; and
at least one processor configured to execute the instructions to:
detect server information from a request for an initiation of encryption of a communication, the request being transmitted by a delivery destination device at the time when the delivery destination device receives data from a server device;
detect a domain name corresponding to the server information; and
perform data communication restriction with respect to the data transmitted from the server device to the delivery destination device based on the domain name,
wherein the at least one processor is configured to execute the instructions to suppress, on the basis of the request, a transfer amount of the data per unit time when data transmitted from the server device to the delivery destination device is relayed.

2. The communication device according to claim 1, wherein the at least one processor is configured to execute the instructions to:
detect Server Name Indication information representing the server information included from the request which is transmitted in an SSL (Secure Sockets Layer)/TLS (Transport Layer Security) communication; and
detect the domain name corresponding to the Server Name Indication information.

3. The communication device according to claim 2, wherein the at least one processor is further configured to execute the instructions to buffer signals for each connection generated in negotiations over the period from initiation of the SSL (Secure Sockets Layer)/TLS (Transport Layer Security) communication until acquisition of the Server Name Indication information.

4. A communication method that causes a communication device to execute steps of:
detecting server information from a request for an initiation of encryption of a communication, the request being transmitted by a delivery destination device at the time when the delivery destination device receives data from a server device;
detecting a domain name corresponding to the server information; and
performing data communication restriction with respect to the data transmitted from the server device to the delivery destination device based on the domain name,
wherein the performing of the data communication restriction includes suppressing, on the basis of the request, a transfer amount of the data per unit time when data transmitted from the server device to the delivery destination device is relayed.

5. A non-transitory computer-readable recording medium storing a program that causes a computer of a communication device to execute steps of:
detecting server information from a request for an initiation of encryption of a communication, the request being transmitted by a delivery destination device at the time when the delivery destination device receives data from a server device;
detecting a domain name corresponding to the server information; and
performing data communication restriction with respect to the data transmitted from the server device to the delivery destination device based on the domain name,
wherein the performing of the data communication restriction includes suppressing, on the basis of the request, a transfer amount of the data per unit time when data transmitted from the server device to the delivery destination device is relayed.

* * * * *